Feb. 14, 1961        E. V. BUNTING        2,971,397

MANUAL CONTROL ASSEMBLY FOR TRACTOR HYDRAULIC SYSTEMS

Original Filed Aug. 20, 1954        2 Sheets-Sheet 1

INVENTOR.
ERNEST V. BUNTING
BY
ATTORNEYS

United States Patent Office 2,971,397
Patented Feb. 14, 1961

2,971,397

MANUAL CONTROL ASSEMBLY FOR TRACTOR HYDRAULIC SYSTEMS

Ernest V. Bunting, Detroit, Mich., assignor to Massey-Ferguson Inc., Racine, Wis., a corporation of Maryland Original application Aug. 20, 1954, Ser. No. 451,276. Divided and this application June 4, 1958, Ser. No. 739,882

4 Claims. (Cl. 74—526)

The invention relates to controls for hydraulic systems and more particularly, to hydraulic systems of the type provided in tractors for raising and lowering attached implements and for regulating their working depths.

The present application is a division of my copending application, Serial No. 451,276, filed August 20, 1954. The parent application relates to a control system for tractors which eliminates the need for selection between any so-called "position" and "draft" control and which affords full and accurate positional control of the implement when it is being raised or lowered and in which control of the working depth is taken over at the proper time and automatically maintained by preset mechanism incorporated in the controls. In that system the controls have a "natural feel," that is, one in which the movements of the coupled implement are coordinated with those of the manual element or control lever both as to direction and rate until the implement has reached its desired working depth whereupon control becomes entirely automatic. Furthermore, the system is constructed and arranged so that the rate of response of the system to corrective adjustment when operating in draft control is adjustable by means of the same lever used to control the raising and lowering of the implement.

One object of the invention is to provide an improved assembly of manual control elements or a lever assembly by which hydraulic systems of the above general character may be preset and controlled.

Other objects and advantages of the invention will become apparent from the following detailed description of the preferred embodiment illustrated in the accompanying drawings in which—

Figure 1:
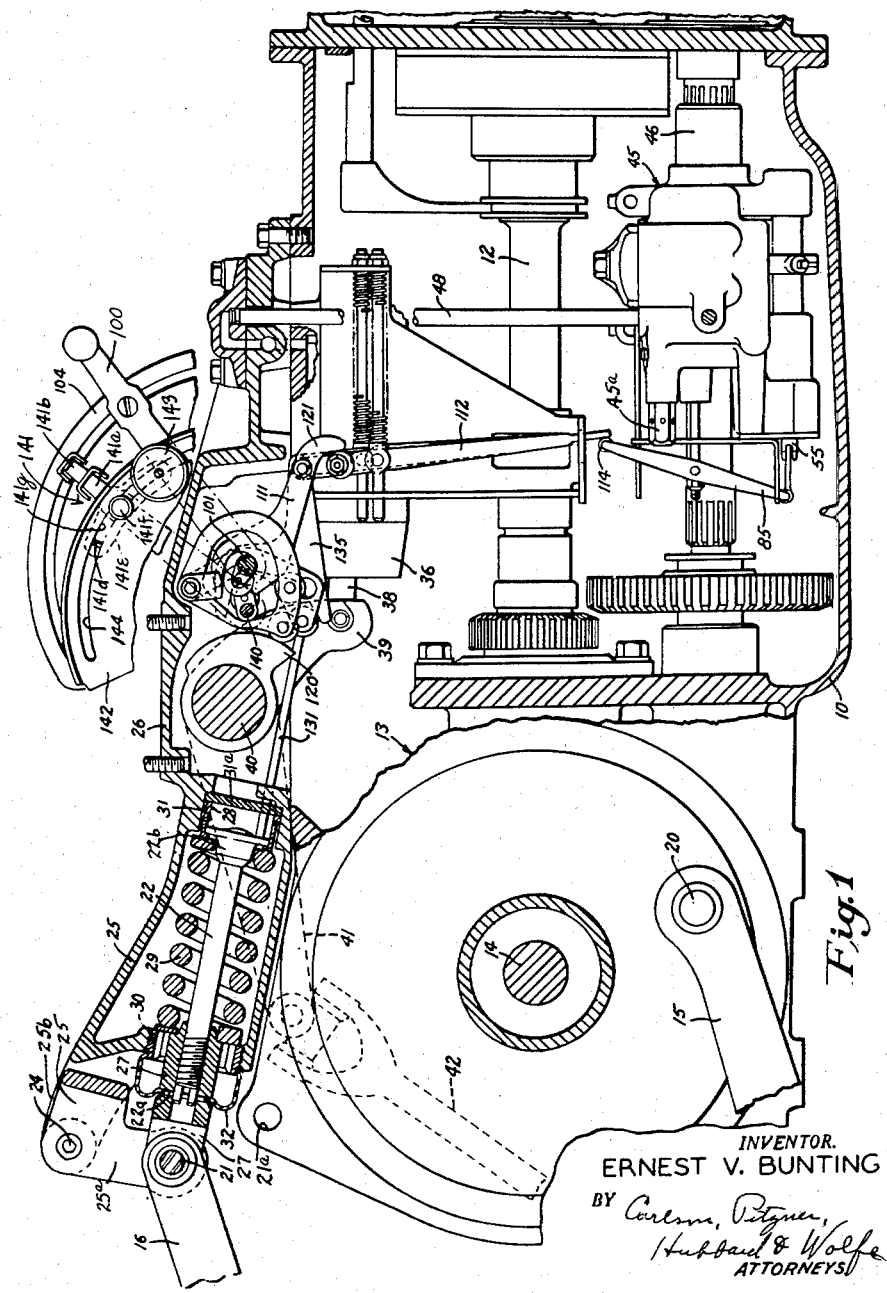
Figure 1 is a longitudinal sectional view through the central portion of a tractor equipped with a hydraulic system and controls embodying the features of the invention.

For purposes of illustration a single preferred embodiment of the invention has been shown and will be described herein in detail. It is to be understood, however, that it is not intended that the detailed character of the disclosure should limit the invention to such particulars. On the contrary, it is intended to cover all equivalents and alternative arrangements falling within the spirit and scope of the invention as it is more broadly and generally characterized in the appended claims.

The tractor shown to illustrate the invention has a center housing 10 which, together with the engine and gear box, constitute the backbone of the frameless tractor body. The tractor is conventionally equipped with front wheels for steering and rear drive wheels, the latter being driven through speed change gearing by way of a power delivery shaft 12, a differential 13 and axle shafts 14.

The exemplary tractor is equipped with a so-called three-point implement hitch familiar on "Ferguson" tractors and including a pair of lower or draft links 15 and an upper or top link 16. The draft links 15 are arranged in trailing relation to the tractor and, at their forward ends, are pivoted as at 20 on the rear portion of the tractor housing to swing vertically about a transverse horizontal axis located below and slightly forward of the axis of the axle shafts 14 for the tractor drive wheels.

Suitable coupling means are provided at the rear ends of the three draft links 15 and 16 for disengageable connection with any desired ground working or other implement to be coupled to the tractor. Alongside the driver's seat is a hand control or quadrant lever 100. Hydraulic power mechanism controlled by this lever effects raising or lowering of the hitch linkage and such implement as it may be carrying.

Raising of the lower draft links 15 is effected through the medium of a hydraulic power mechanism or unit which is powered by the tractor engine. Various forms of hydraulic actuators or motors are known in the art. In the illustrative embodiment, a so-called one-way ram is employed. It comprises a cylinder 36 bolted or otherwise rigidly secured to the underside of a cover plate 26 for the tractor center housing. The cylinder opens to the rear and slidably receives a piston having a piston rod 38 projecting rearwardly therefrom. The ball-shaped outer end of the piston rod is received in the socketed lower end of an arm 39 rigid with a transverse rockshaft 40 journaled in the upper rear portion of the tractor body, in this instance, in the cover plate 26. The ends of the rockshaft 40 project at opposite sides of the cover and each end has a crank arm 41 splined on it and connected to one of the lower draft links by a drop link 42.

The arrangement is such that when pressure fluid (such as oil) is supplied to the closed end of the cylinder 36, the piston is forced rearwardly to rock the arms 41 upwardly and thus raise the lower draft links 15. Similarly upon exhaust of fluid from the cylinder the piston is permitted to retreat into the cylinder under the urging of the gravity load of the links 15 (and any implement attached to them) so that the links swing downwardly in a lowering direction.

The volumetric rate at which oil is supplied to or exhausted from the ram cylinder 36 will accordingly determine the rate at which the draft links 15 are raised or lowered. In the exemplary tractor pressure fluid is supplied to the ram cylinder from a positive displacement pump 45 located in the tractor center housing below the ram. The lower portion of the housing is flooded with oil constituting a sump for the system. Oil enters the pump through an intake in the pump casing and is discharged from the pump through a conduit 48 leading to the closed end of the cylinder 36. A spring loaded safety valve 45a relieves the high pressure side of the pump when excessive pressure develops. The pump 45 is driven from the tractor engine through a pump and lower take-off drive shaft 46 independently of the change-speed transmission.

In accordance with the present invention provision is made so that by swinging the quadrant lever 100 up and down a great variety of implements may be controlled smoothly and easily and with a fidelity and scope of response heretofore unrealized. Control of the pressure fluid supply is effected through the medium of a control valve having a plunger 55 slidable axially into and out of a valve casing incorporated in the pump housing. For present purposes it is sufficient to state that the arrangement is such that the plunger 55 is yieldably urged rearwardly or toward a "drop" position permitting fluid to vent from the ram cylinder 36. The plunger may be shifted forwardly as by an actuating lever 85 to open the pump intake and thus initiate the supplying of fluid under pressure to the ram cylinder. In its central or neutral position the valve plunger blocks both the intake for the pump and vent for the ram cylinder and thus locks the linkage raising and lowering mechanism in a fixed position.

Two types or sources of control action are present in the exemplary hydraulic system, one manual and the other automatic. So far as the automatic aspect is concerned, soil reaction on the implement is measured by a control spring assembly on the tractor, force being applied to it through the top link 16 of the hitch. The linkage through which this force is utilized to position the valve plunger 55 is described in detail in my copending application above mentioned. For present purposes it is sufficient to note that it includes a linearly movable control member herein shown as a push rod 131 passing beneath the rockshaft 40 and adapted to be displaced axially in proportion to soil reaction (draft load) on the implement. Such displacement is utilized to rock the valve actuating lever 85 and position the valve plunger 55. Likewise, vertical positioning of the hitch linkage is automatically measured by the rotational position of an edge cam 120 fastened on the rockshaft 40 and therefore always positioned in agreement with the draft links. The cam is utilized for swinging the actuating lever 85 and positioning the valve plunger 55 as described in detail in my above-mentioned copending application.

Figure 2:
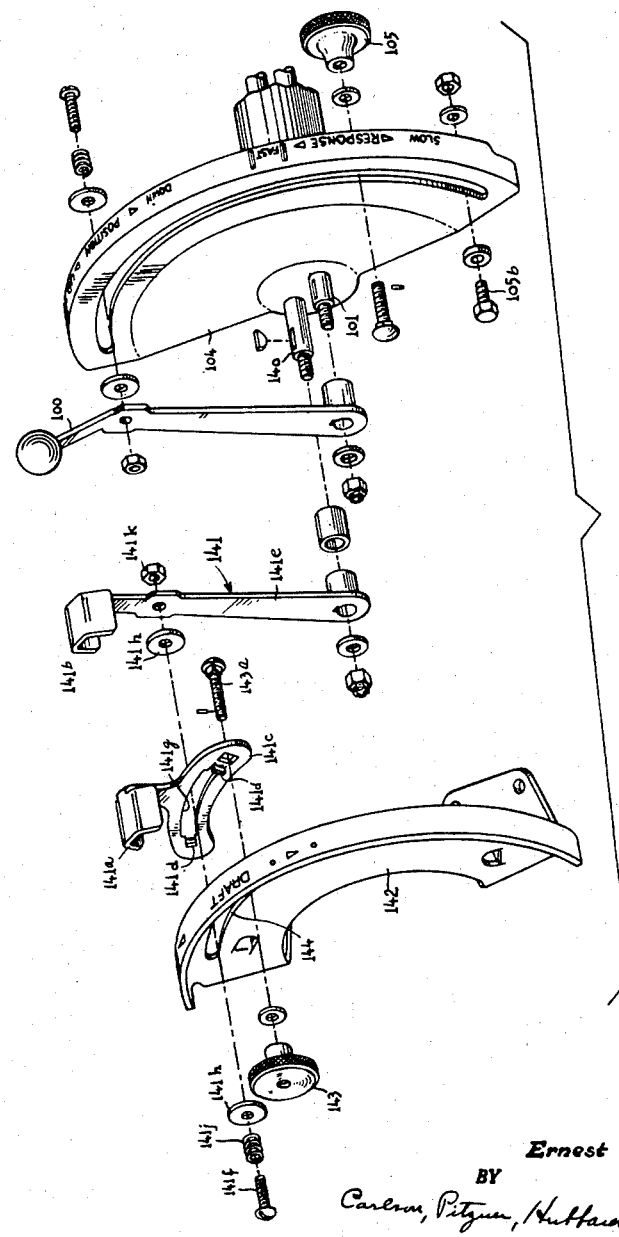
Fig. 2 is an exploded perspective view showing details of the manual operating elements or levers by which the system is controlled.

So far as concerns manual adjustment or control, the driver uses the main quadrant lever 100. This lever is fixed on the outer end of a shaft 101 journalled in a hollow supporting arm supported in the cover plate 26. A slotted metal quadrant 104 serves as a guide for the lever. Stop bolts of which only the bolt 105b (Fig. 2) constitute presettable stops at the ends of the quadrant slot. An adjustable stop with a knurled nut or knob 105 can be adjusted along the lower portion of the slot to aid the driver in returning the lever 100 to a setting which he has found desirable for a given implement under particular conditions.

Alongside the main quadrant is a second or auxiliary quadrant 142 slotted as at 144. Riding on the second quadrant is what may be termed "a depth setter" designated generally as 141. This depth setter has two sheet metal handles or fingerpieces 141a and 141b. The first handle is integral with a slide 141c of inverted T-shape having a pair of spaced tangs 141d guidingly received in the slot 144. A bolt 143a having a squared shoulder engaged in a complemental recess in the slide extends through the slot 144 for cooperation with a knurled nut or knob 143 which releasably secures the slide 141c in selected positions of adjustment to which it is moved by its fingerpiece 141a. The other fingerpiece 141b is fashioned on the end of a lever 141e non-rotatably fixed to the outer end of a shaft 140. A bolt 141f passing through the slot 144 and arcuate slot 141g in the slide 141c and an aperture in the lever 141e carries friction washers 141h disposed for engagement with the outer faces of the quadrant 142 and the slide 141c. A spring 141j interposed between the head of the bolt and the adjacent washer in cooperation with a jamb nut 141k threaded on the bolt serves to retain the lever 141e in frictional contact with the slide 141c.

To use the depth setter the driver loosens the knob 143, grasps the pair of fingerpieces 141a, 141b and slides them downwardly to a position corresponding to the working depth (actually the draft load) which he requires for the implement. Then he retightens the knob 143. Should he wish to make some short-time field adjustment, he grasps the fingerpiece 141b alone, pushing it up or down as required. Then to restore the previous setting he has only to squeeze the fingerpiece together, bringing the finger 141b back into registry with 141a.

The depth setter 141 is in general left at the working depth found best for the particular implement being used. The driver pulls up or lowers the main quadrant lever 100 to raise or lower the implement. Once in the soil the system will automatically retain the depth (draft load) fixed by the depth setter 141. Occasions for changing the setting of the latter are, of course, comparatively infrequent.

In considering the mechanism here illustrated for functionally interconnecting the valve plunger 55 with those various manual and automatic sources of control modulation, it will be expedient first to trace the mechanical connections from the quadrant lever 100 and position cam 120 by which the basic follow-up or position control action between quadrant lever and hitch links is effectuated.

The shaft 101 upon which the main quadrant lever 100 is mounted has a radially projecting arm or eccentric portion carrying a roller positioned between a pair of jaws formed at one end of a cam lever 111 connected to the upper end of an intermediate valve actuating lever 112. The turned down forward end 121 of the lever 111 is hooked over an eccentric secured to the lever 112. The lever 112 is pivotally supported intermediate its ends with its lower end positioned in the path of a roller 114 mounted on the upper end of the valve actuating lever 85.

The arrangement of the parts is such that movement of the control lever 100 to its uppermost position swings the lever 111 in a clockwise direction. Assuming that the hitch links 15 are in a lowered position the cam 120 will be holding its associated follower and linkage in a forward position and consequently movement of the quadrant lever rocks the lever 112 clockwise and the lever 85 counterclockwise to shift the valve plunger 55 forward to "raise" position. The power operating system accordingly responds to raise the hitch linkage. As the hitch links rise the cam 120 turns in unison with the rise of the links so that the cam lever 111 is moved rearwardly. Accordingly, the valve plunger is progressively shifted toward and to its neutral position by the urging of an associated biasing spring. In this instance, the valve arrives at neutral as the hitch reaches transport position.

To lower the hitch, the control lever 100 is swung downwardly as, for example, toward the position shown in Fig. 1. This raises the rear end of the cam lever 111 and the consequent rocking of the levers 112 and 85 permits the valve plunger 55 to shift toward the drop position. The control valve opens to exhaust fluid from the ram, thus permitting the hitch to descend.

As the hitch descends the cam 120 progressively shifts the cam lever and the associated elements including the valve plunger 55 toward the neutral position so as to interrupt the exhaust of fluid from the ram when the hitch reaches a position corresponding to the position to which the control lever 100 has been moved. Full lowering is accomplished by further movement of the control lever 100 in a downward direction. It will thus be seen that the hitch may be raised and lowered by shifting the control lever 100 through the upper portion of its range. The hitch follows precisely the movements of the control lever and comes to rest in a position corresponding to that in which the lever is stopped. Moreover, the movements of the hitch approximates the movements of the lever as to rate so that the driver can raise or lower the hitch rapidly or slowly as desired and, of course, can stop the movement in any desired position.

To provide for selectively determining the draft load to be maintained on the hitch, the shaft 140 upon which the depth setter 141 is mounted is formed with an eccentric arm carrying a roller adapted to cooperate with and variably position a cam lever 135. This cam lever in accordance with its position is actuated by the push rod 131 and in turn adjusts the associated linkage to determine the point at which the linkage intercepts the valve actuating lever 85. More specifically, this adjustment determines the inwardly displaced position of the control rod 131 required to return the control valve plunger to neutral position or, in other words, the draft load to be maintained on the hitch.

Having in mind the construction and arrangement of the lever assembly, its operation will be readily apparent. Once the implement is connected to the hitch links 15, it is only necessary to pull up the quadrant lever 100 to raise the implement to transport position. It rises to the height fixed by that lever.

To operate the implement, the depth setter 141 is adjusted to approximately the setting which the tractor driver thinks will be suitable. The driver then swings the quadrant lever downward, lowering the implement. By watching the implement as it is drawn through the soil, adjustments of the depth setter 141 may be made to obtain precisely the desired working depth. The depth setter is then locked in that position by tightening the knob 143. If the system seems to be over-controlling, detected by vibration of the equipment, the quadrant lever 100 is eased down until vibration stops. Such roughness is usually due to an implement lowering too rapidly and the system's corrective adjustment of its depth. Lowering of the quadrant lever 100 beyond the position control point adjusts such lowering rate.

At the end of a traverse the quadrant lever 100 is raised, lifting the implement so that the tractor can be turned for the next traverse. The implement is then returned to working position by swinging the quadrant lever 100 down to the position fixed by the knob 105. The depth setter 141 remains in the position in which it was previously set.

I claim as my invention:

1. The combination in a power operating system for a tractor-borne implement hitch having a power operated actuator for raising and lowering the hitch, of control means for the actuator including a lever pivoted adjacent one end to swing through a predetermined range, a guide quadrant supported at one side of said lever, said quadrant being formed with a slot arcuate about the pivot of the lever, a member slidable in said slot, means connecting said lever and said member for limited relative movement, and means for locking said member in any selected position in said slot to restrict said lever to swinging movement within a selected portion of its predetermined range determined by the limiting action of said connecting means.

2. The combination in a power operating system for a tractor-borne implement hitch having a power operated actuator for raising and lowering the hitch, of control means for the actuator including a lever pivoted adjacent one end on the tractor to swing through a predetermined range, a guide quadrant mounted on the tractor alongside said lever, and a slide supported on said quadrant and defining a pair of abutments engageable by said lever to confine the movements of the lever to a range substantially smaller than its full range, said slide being adjustable relative to said quadrant simultaneously with the swinging of said lever to locate a selected portion of said range, and means for releasably locking said slide in a fixed position.

3. The combination in a power operating system for a tractor-borne implement hitch having a power operated actuator for raising and lowering the hitch, of control means for the actuator including a lever pivoted adjacent one end of the tractor, a guide quadrant mounted on the tractor alongside said lever, said quadrant being formed with a slot arcuate about the pivot of said lever, a slide having an arcuate slot of the same radius as the slot in said quadrant, spaced elements on said slide engageable in the slot in the quadrant to locate the slide with the two slots in alinement and operative to guide the slide in an adjusting movement relative to the quadrant, a bolt extending through said lever and through the alined slots in the quadrant and the slide, and means for locking said slide in any selected position on the quadrant whereby the ends of the slot in the slide cooperate with said bolt to confine the pivoting movements of said lever to a range substantially smaller than the range afforded by the slot in the quadrant.

4. The combination in a power operating system for a tractor-borne implement hitch having a power operated actuator for raising and lowering the hitch, of control means for the actuator including a lever pivoted adjacent one end on the tractor to swing through a predetermined range, a finger piece on the free end of the lever for swinging it on its pivot, a guide quadrant mounted on the tractor alongside said lever, means movable with said lever cooperating with said quadrant to define the limit positions of the lever in said predetermined range, a member mounted on said quadrant for movement in an arcuate path, said member having means cooperating with said means on the lever to restrain relative movements of the lever and the member to a range substantially smaller than its predetermined range, a finger piece on said member disposed adjacent the finger piece on said lever to facilitate simultaneous movement of the lever and the member to a selected position relative to said quadrant, and means for releasably locking said member to said quadrant so as to restrict the lever to movement in said smaller range from said selected position.

References Cited in the file of this patent

UNITED STATES PATENTS

| | | |
|---|---|---|
| 2,401,741 | Korodi et al. | June 11, 1946 |
| 2,458,446 | Suska | Jan. 4, 1949 |
| 2,522,339 | Bartrug | Sept. 12, 1950 |
| 2,664,015 | Moore | Dec. 29, 1953 |
| 2,703,499 | Reid | Mar. 8, 1955 |
| 2,802,374 | Reid | Aug. 13, 1957 |

FOREIGN PATENTS

| | | |
|---|---|---|
| 377,532 | Great Britain | July 28, 1932 |
| 464,686 | Great Britain | Apr. 19, 1937 |